(12) United States Patent
Pance et al.

(10) Patent No.: US 8,519,564 B2
(45) Date of Patent: Aug. 27, 2013

(54) MULTI-OUTPUT POWER SUPPLY

(75) Inventors: Aleksandar Pance, Saratoga, CA (US);
Nicholas Alan Rundle, San Jose, CA (US); John Douglas Field, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 12/778,738

(22) Filed: May 12, 2010

(65) Prior Publication Data
US 2011/0278923 A1 Nov. 17, 2011

(51) Int. Cl.
H02J 3/14 (2006.01)

(52) U.S. Cl.
USPC .......................................................... 307/31

(58) Field of Classification Search
None
See application file for complete search history.

(56) References Cited

U.S. PATENT DOCUMENTS

| | | |
|---|---|---|
| 3,626,408 A | 12/1971 | Carbrey |
| 4,101,787 A | 7/1978 | Vail |
| 4,149,162 A | 4/1979 | Enemark et al. |
| 4,413,221 A | 11/1983 | Benjamin et al. |
| 4,423,379 A | 12/1983 | Jacobs et al. |
| 4,868,732 A * | 9/1989 | Gillett et al. .................... 363/90 |
| 5,036,284 A | 7/1991 | Cichanski |
| 5,061,898 A | 10/1991 | Oram et al. |
| 5,185,565 A | 2/1993 | Uchida |
| 5,268,845 A | 12/1993 | Startup et al. |
| 5,438,270 A | 8/1995 | Harper et al. |
| 5,477,132 A | 12/1995 | Canter et al. |
| 5,504,415 A | 4/1996 | Podrazhansky et al. |
| 5,623,210 A | 4/1997 | Sakamoto |
| 5,640,079 A | 6/1997 | Nelson et al. |
| 5,654,740 A * | 8/1997 | Schulha ........................ 345/156 |
| 5,684,686 A | 11/1997 | Reddy |
| 5,710,504 A | 1/1998 | Pascual et al. |
| 5,831,351 A | 11/1998 | Kohosrowpour et al. |
| 5,852,557 A | 12/1998 | Woodward |
| 5,912,552 A | 6/1999 | Tateishi |
| 5,939,864 A | 8/1999 | Lenhart et al. |
| 6,008,629 A | 12/1999 | Saeki et al. |
| 6,057,666 A | 5/2000 | Dougherty et al. |
| 6,061,638 A | 5/2000 | Joyce |
| 6,064,187 A | 5/2000 | Redl et al. |
| 6,067,241 A | 5/2000 | Lu |

(Continued)

FOREIGN PATENT DOCUMENTS

| | | |
|---|---|---|
| DE | 19504468 | 8/1995 |
| EP | 1961621 | 8/2008 |

(Continued)

*Primary Examiner* — Carlos Amaya
(74) *Attorney, Agent, or Firm* — Womble Carlyle Sandridge & Rice, LLP (57) ABSTRACT

An apparatus for providing power to an electronic device may include a power input configured to receive an input voltage from a power supply, and a rectifier operatively connected to the power input and configured to convert the input voltage to a first voltage. The rectifier may further be configured to transmit the first voltage to a first power output operatively connected to the rectifier. The apparatus may further include a power converter operatively connected to the rectifier and configured to convert the first voltage to a second voltage different than the first voltage and a first relay operatively connected to the rectifier to selectively prevent the first voltage from being transmitted through the first power output. The power converter may further be configured to transmit the second voltage to a second power output operatively connected to the power converter.

10 Claims, 10 Drawing Sheets

(56) References Cited

U.S. PATENT DOCUMENTS

| | | | |
|---|---|---|---|
| 6,144,194 A | 11/2000 | Varga | |
| 6,229,293 B1 | 5/2001 | Farrenkopf | |
| 6,268,711 B1 | 7/2001 | Bearfield | |
| 6,307,378 B1 | 10/2001 | Kozlowski | |
| 6,313,636 B1 | 11/2001 | Pohl et al. | |
| 6,323,627 B1 | 11/2001 | Schmiederer et al. | |
| 6,326,774 B1 | 12/2001 | Mueller et al. | |
| 6,331,365 B1 | 12/2001 | King | |
| 6,337,560 B1 | 1/2002 | Kalogeropoulos et al. | |
| 6,366,070 B1 | 4/2002 | Cooke et al. | |
| 6,400,123 B1 | 6/2002 | Bean et al. | |
| 6,507,168 B1 | 1/2003 | Matsuda et al. | |
| 6,534,993 B2 | 3/2003 | Bertness | |
| 6,548,755 B2 | 4/2003 | Wu | |
| 6,583,606 B2 | 6/2003 | Koike et al. | |
| 6,661,116 B1 | 12/2003 | Seto | |
| 6,677,734 B2 | 1/2004 | Rothleitner et al. | |
| 6,683,441 B2 | 1/2004 | Schiff et al. | |
| 6,762,563 B2 | 7/2004 | St. Germain et al. | |
| 6,771,046 B2 | 8/2004 | Ariga et al. | |
| 6,809,504 B2 | 10/2004 | Tang et al. | |
| 6,836,157 B2 | 12/2004 | Rader et al. | |
| 6,914,412 B2 | 7/2005 | Wang et al. | |
| 6,947,178 B2 | 9/2005 | Kuo et al. | |
| 6,980,912 B2 | 12/2005 | Patino et al. | |
| 7,012,402 B2 | 3/2006 | Miller et al. | |
| 7,078,908 B2 | 7/2006 | Fujita et al. | |
| 7,157,888 B2 | 1/2007 | Chen et al. | |
| 7,191,077 B2 | 3/2007 | Mese et al. | |
| 7,216,044 B2 | 5/2007 | Kato et al. | |
| 7,242,169 B2 | 7/2007 | Kanamori et al. | |
| 7,259,538 B2 | 8/2007 | Melton et al. | |
| 7,266,001 B1 | 9/2007 | Notohamiprodjo et al. | |
| 7,274,112 B2 | 9/2007 | Hjort et al. | |
| 7,282,891 B2 | 10/2007 | Smallwood et al. | |
| 7,388,349 B2 | 6/2008 | Elder et al. | |
| 7,412,305 B2 | 8/2008 | Berard | |
| 7,570,015 B2 | 8/2009 | Bansal et al. | |
| 7,598,711 B2 | 10/2009 | Krah et al. | |
| 7,646,620 B2 | 1/2010 | MacDonald et al. | |
| 7,688,029 B2 | 3/2010 | Hoffman | |
| 7,702,178 B2 | 4/2010 | Bergen et al. | |
| 7,719,227 B2 | 5/2010 | Lamoreux et al. | |
| 7,852,046 B2 | 12/2010 | Krah et al. | |
| 2003/0015993 A1 | 1/2003 | Misra et al. | |
| 2003/0042794 A1* | 3/2003 | Jarrett, Jr. | 307/23 |
| 2003/0048096 A1* | 3/2003 | Liu et al. | 320/125 |
| 2004/0085694 A1* | 5/2004 | Germagian et al. | 361/90 |
| 2005/0077875 A1 | 4/2005 | Bohley | |
| 2005/0173989 A1* | 8/2005 | Wu | 307/82 |
| 2006/0075266 A1* | 4/2006 | Popescu-Stanesti et al. | 713/300 |
| 2006/0174141 A1 | 8/2006 | Chang | |
| 2007/0091187 A1 | 4/2007 | Lin | |
| 2008/0090133 A1 | 4/2008 | Lim et al. | |
| 2008/0167088 A1* | 7/2008 | Rabu et al. | 455/573 |
| 2009/0059255 A1 | 3/2009 | Ohide | |
| 2009/0085523 A1* | 4/2009 | Kim | 320/138 |
| 2009/0208824 A1 | 8/2009 | Greening et al. | |
| 2009/0261653 A1 | 10/2009 | Furukawa et al. | |
| 2009/0289603 A1 | 11/2009 | Mahowald | |
| 2009/0315411 A1 | 12/2009 | Depew | |
| 2010/0027906 A1 | 2/2010 | Hara et al. | |
| 2011/0074360 A1 | 3/2011 | Kerr et al. | |
| 2011/0074434 A1 | 3/2011 | Staton | |

FOREIGN PATENT DOCUMENTS

| | | |
|---|---|---|
| FR | 2090074 | 1/1972 |
| GB | 2046923 | 11/1980 |
| GB | 2275118 | 8/1994 |
| WO | WO2008/075358 | 6/2008 |

* cited by examiner

MULTI-OUTPUT POWER SUPPLY

TECHNICAL FIELD

The disclosed embodiments relate generally to power supplies for supplying power to electronic devices, such as portable electronic devices, and more specifically to power adapters and connector cords configured to supply differing voltages to two or more electronic devices.

BACKGROUND

Power adapters may be used to supply power to a variety of portable electronic devices, including laptop computers, personal digital assistants (PDAs), cell phones, digital media players, cameras, and so on, to operate such devices and/or to charge a rechargeable battery in such devices. The power supplied from power adapters is typically received from an external power source supplying alternating current (AC) voltage. The power adapter may then convert the AC voltage into a direct current (DC) voltage that can be used by a connected electronic device.

Most commercially available adapters do not include multiple outputs for supplying different DC voltage levels for powering multiple electronic devices and/or multiple internal batteries. As such, users may often purchase a device-specific adapter for powering a device. However, this requires that the user carry a separate adapter for each device, which can be cumbersome when a user is traveling, as many users may forget to bring all of the associated adapters required for various devices. Additionally, many adapters may be relatively heavy and bulky, making them difficult to carry while in transit. Likewise, having multiple adapters in a stationary location (such as a home or office) may be confusing.

What is needed is a way to supply power to multiple connected electronic devices so that a user does not have to carry additional power adapters while traveling with multiple portable electronic devices.

SUMMARY

Generally, embodiments discussed herein may provide power to multiple electronic devices using a single power adapter. The embodiments typically, but not necessarily, include a DC-to-DC converter and multiple outputs for supplying power to two or more electronic devices. The DC-to-DC converter may be provided in the adapter itself, or may be provided in a cord or a connector that may be connected to the adapter and an electronic device. Additionally, some embodiments include a relay for intelligently controlling power supplied through the outlets so that power is supplied only to voltage or manufacturer compatible electronic devices.

One embodiment takes the form of an apparatus for providing power to an electronic device may include a power input configured to receive an input voltage from a power supply, and a rectifier operatively connected to the power input and configured to convert the input voltage to a first voltage. The rectifier may further be configured to transmit the first voltage to a first power output operatively connected to the rectifier. The apparatus may further include a power converter operatively connected to the rectifier and configured to convert the first voltage to a second voltage different than the first voltage and a first relay operatively connected to the rectifier to selectively prevent the first voltage from being transmitted through the first power output. The power converter may further be configured to transmit the second voltage to a second power output operatively connected to the power converter.

In one embodiment, the apparatus may include a second relay operatively connected to the power converter to selectively prevent the second voltage from being transmitted through the second power output. In another embodiment, the first relay may include a first logic configured to determine whether an electronic device operatively connected to the first power output is compatible with the first voltage. In a further embodiment, the second relay may include a second logic configured to determine whether an electronic device operatively connected to the second power output is compatible with the second voltage. In another embodiment, the first logic may be operatively connected to a first control line.

In some embodiments, first control line and the first power output may be contained within a single output connector. In other embodiments, the connector may terminate in a magnetic connector. In another embodiment, the first logic may be configured to determine whether an electronic device is compatible with the first voltage based at least partially on whether the control line is in an active or inactive state. A further embodiment may include a housing enclosing at least the first power output and the second power output.

Another embodiment takes the form of a method for supplying power to two or more electronic devices. The method may include receiving a first voltage of a first current type having a first voltage level and converting the first voltage to a second voltage of the first current type. The second voltage may have a second voltage level. The method may further include determining whether a first device is compatible with the first voltage level, determining whether a second device is compatible with the second voltage level, and in the event that the first device is compatible with the first voltage level, supplying the first voltage to the first power output. The method may also include supplying the second voltage to the second power output in the event that the second device is compatible with the second voltage level.

Another embodiment takes the form of a connector cable. The connector cable may include a power input configured to receive a first voltage and a power converter operatively connected to the power input. The power converter may be configured to convert the first voltage to a second voltage having a second voltage level. The connector cable may further include a first connector operatively connected to the power input, a second connector operatively connected to the power converter, and a connector housing enclosing at least the first and second connectors.

These and other embodiments and features will be apparent to those of ordinary skill in the art upon reading this disclosure in its entirety, along with the appended claims.

DETAILED DESCRIPTION

The embodiments discussed herein may provide power to multiple electronic devices using a single power adapter. The embodiments typically include a DC-to-DC converter and multiple outputs for supplying power to two or more electronic devices requiring different DC voltage levels for operation. The DC-to-DC converter may be provided in the adapter itself, or may be provided in a cord (or cable) or a connector that may be connected to the adapter. Additionally, some embodiments include a relay for intelligently controlling power supplied through the outlets so that power is supplied only to voltage, and/or manufacturer, and/or other compatible electronic devices, as determined by manufacturer criteria It should be noted that the adapters, connectors, and/or cords, as described herein, may be used with any appropriately-configured portable electronic device or non-portable device, for that matter. Suitable electronic devices include, but are not limited to, mobile telephones, portable computers, tablet computing devices, input/output devices, portable video players, portable televisions, personal digital assistants, headphones, and so on.

Figure 1A:
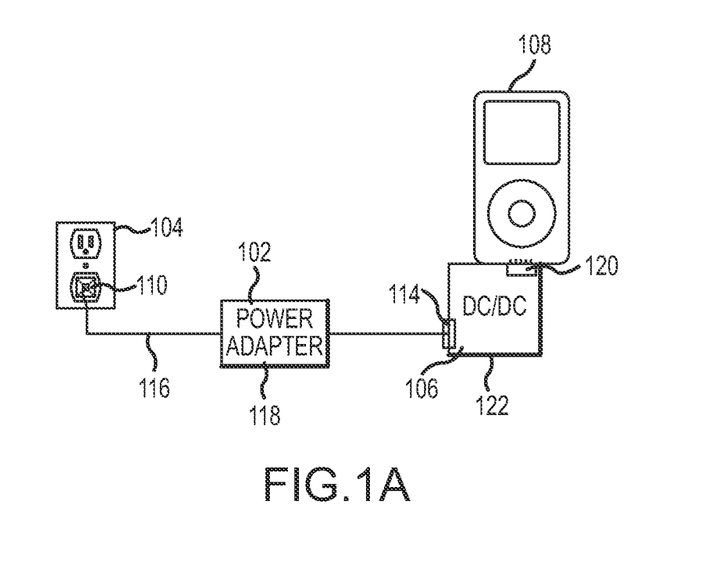
FIG. 1A illustrates an embodiment of a power adapter connected to a DC-to-DC converter connected to an electronic device.

As shown in FIG. 1A, in one embodiment, a power adapter 102 may be connected to a power source 104 via a plug 110. The term "connected" or "coupled," as used herein, means connected or coupled, either directly or indirectly. The power source 104 may be any source of electrical power, including, but not limited to, an AC power source as shown in FIG. 1, a DC power source, and so on. The power adapter 102 may be connected to a voltage or power converter 106, which, in turn, may be connected to an electronic device 108. As will be further described below, the voltage converter 106 may be a DC-to-DC converter 124. The electronic device 108 may or may not have its own internal rechargeable battery. The sample electronic device 108 shown in FIG. 1A and discussed herein is a portable media player, such as an iPod™, iPhone™, or iPad™ as manufactured by Apple Inc., but it should be understood that any electronic device may be appropriately configured and substituted.

The adapter 102 may include an output connector 114 operable to connect the adapter 102 to the converter 106, as well as an input power line 116 that may connect the adapter 102 to the external power source 104. In some embodiments, the adapter 102 may further include an outer housing 118 for protecting the internal components of the adapter 102. The input power line 116 may include a line or a cord coupled to a plug 110 configured for plugging into the external power source 104. In other embodiments, the plug 110 may extend directly from the housing 118, rather than from a cord.

As is known, the adapter 102 may include an AC-to-DC converter or rectifier for converting the AC voltage received from the power source into DC voltage that is fed into the power converter 106. In other embodiments, the adapter may not include a rectifier, or may include a DC-to-DC converter, depending on the type and voltage of the power output from the power source 104. The rectifier may be configured to convert the AC voltage to a DC voltage having a first voltage level V1. This voltage level may vary according to different embodiments. However, in one embodiment, the first voltage level may be approximately 18.5 V. In one embodiment, the adapter 102 may be a power brick manufactured by Apple Inc. However, other adapters can be used in conjunction with different embodiments.

The output connector 114 of the adapter 102 may be received by an input port (not shown) of the DC-to-DC converter 106. In some embodiments, the connector 114 may include a quick release mechanism that enables the connector to disengage from the receiving port if it is tugged on, for instance by someone exerting force on the output cord. In addition, the output connector 114 may further include a light indicator, such as a light-emitting diode (LED), configured to indicate the state (e.g., powered or unpowered) of the adapter 102. One connector that may be used in conjunction with an embodiment of the power adapter 102 is the MAGSAFE connector manufactured by Apple Inc.

As shown, the power converter 106 may include an output connector 120 connecting the converter 106 to the electronic device 108, as well as an input port (not shown) for receiving the output connector 114 of the adapter 102. In some embodiments, the converter 106 may further include an outer housing 122 for protecting the internal components of the converter. One connector that may be used in conjunction with an embodiment of the converter 106 may be a 30-pin connector, as manufactured by Apple Inc. The connector 120 may be integrated into the exterior housing of the power converter 106, so that the converter may function as a docking station, or, in other embodiments, may be connected to the converter via a cord or other connection mechanism.

Figure 1B:
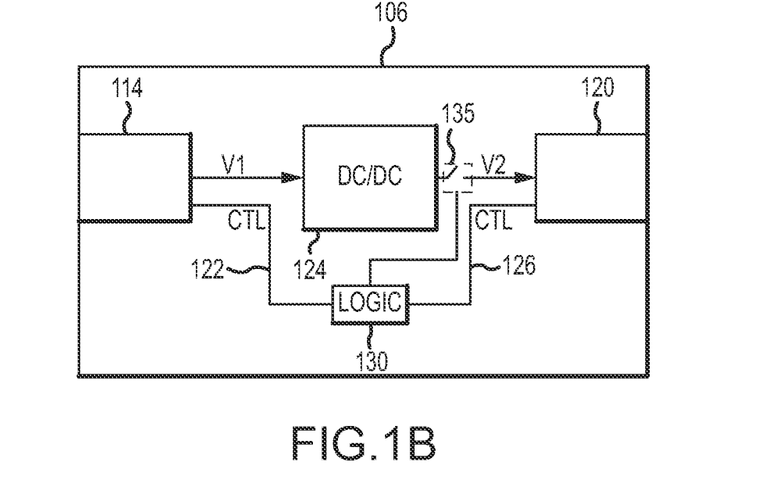
FIG. 1B is a block diagram of the embodiment of the DC-to-DC converter shown in FIG. 1.

FIG. 1B is a block diagram schematically illustrating some of the internal components of the converter 106 shown in FIG. 1A. Generally, the power converter 106 may be configured to receive voltage at a first voltage level V1 from the power adapter 102 and convert the voltage into a voltage of a second voltage level V2 different from the first voltage level. The power converter 106 may then supply to voltage at the second voltage level V2 to a connected electronic device. The second voltage level V2 may vary according to different embodiments. However, in one embodiment, the first voltage level may be approximately 5 V.

Referring to FIG. 1B, the converter 106 may include a port for receiving the output connector 114 of the adapter 102. The connector 114 may be connected to a DC-to-DC converter 124 in order to supply voltage from the output connector 114 to the DC-to-DC converter. As is known, the DC-to-DC converter 124 may be an electronic circuit that converts the voltage V1 from a first DC source to a second voltage V2. The second voltage V2 may be greater or smaller than the first voltage V1, depending on whether a buck converter or a boost converter is used. The DC-to-DC converter 124 may be connected to the output connector 120 of the converter 106 so as to supply the second voltage V2 to the electronic device 108. As discussed above, in one embodiment, the voltage V1 input to the converter 106 may be approximately 18.5V and the voltage V2 output by the converter may be approximately 5V, although the embodiments are not limited to these particular voltages.

In one embodiment, the adapter output connector 114 and the converter connector 120 may each include control pins that may be connected to respective control lines 122, 126 in the converter 106. As is shown, the control lines 122, 126 may be connected to a relay including logic 130. In one embodiment, the logic 130 may be configured to determine whether a connected power converter 106 is compatible with the power adapter 102, and/or whether a connected electronic device 108 is compatible with the converter 106. For example, the logic 130 may be configured to determine whether the electronic device 108, adapter 102, and/or converter 106 are brand compatible, e.g., whether these components are manufactured or designed by a particular corporation. In another embodiment, the logic may be configured to determine whether the voltage level V1 output by the adapter 102 is suitable for conversion by the converter 120 and/or whether the voltage level V2 output by the converter is suitable for powering or charging the electronic device 108, e.g., to prevent damaging the internal electrical components of the connected device. Other criteria, such as a product line or identifier, a region or circuitry identifier, a registration indication and so on, may be used by the logic to determine charging functionality.

In one embodiment, the logic 130 may be a circuit configured to execute the logic functions. In other embodiments, the logic functions may be executed by a microprocessor, software, or any other software or hardware configured to perform the logic functions discussed herein.

As discussed above, the logic may function as a relay for opening or closing a switch 135 to allow current to flow to a connected device when the control line is in an active state and disconnected when the control line is in an inactive state. For example, the control line 122, 126 may be active when a compatible device 108 is plugged into the connector 120 and/or when a compatible output connector 114 is plugged into the input port of the converter 106, and inactive when an incompatible device is plugged into the connector or if no device is plugged into the connector. The relay may be a solid state relay, an electromechanical relay, and so on and so forth.

Other embodiments may utilize a mechanical pin configuration, rather than a relay, for preventing an improper voltage level from being supplied to a connected electronic device. For example, the mechanical pin configuration may include a connector that includes a unique pin configuration that is configured for insertion into a unique port configuration. Accordingly, the connectors of incompatible electronic devices are from being connected to the adapter and/or converter connectors. Additionally, some embodiments may utilize a microcontroller unit for controlling current flow between the converter 106 and the electronic device 108. Additionally, it should be noted that while FIGS. 1A and 1B show a converter 106 with a single output connector 120, other embodiments of converters may include multiple output connectors supplying voltages of the same or different levels and/or multiple DC-to-DC converters.

Figure 2A:
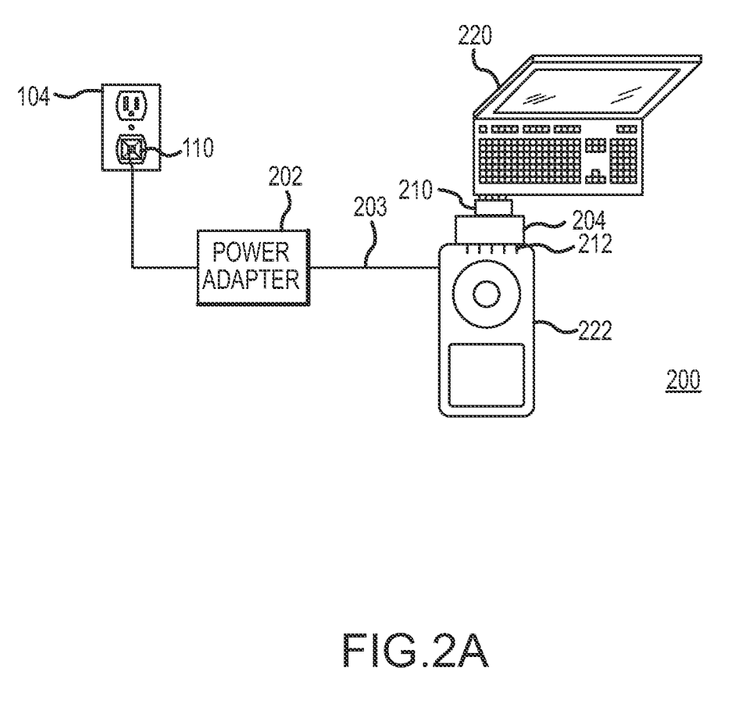
FIG. 2A illustrates an embodiment of an adapter connected to a multi-output connector cord connected to multiple electronic devices.
Figure 2B:
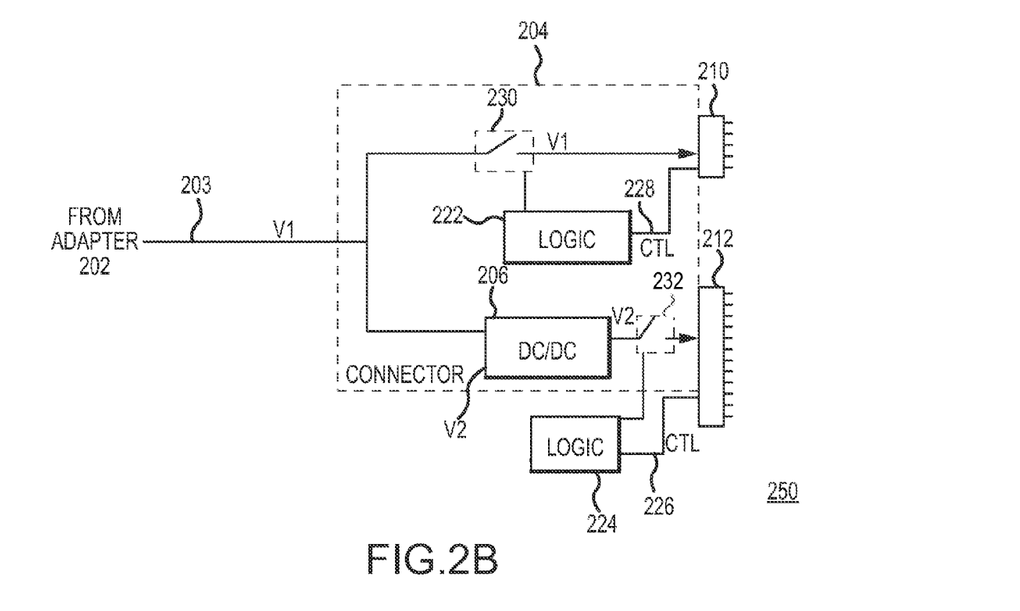
FIG. 2B is a block diagram of one embodiment of the multi-output connector cord shown in FIG. 2A.
Figure 2C:
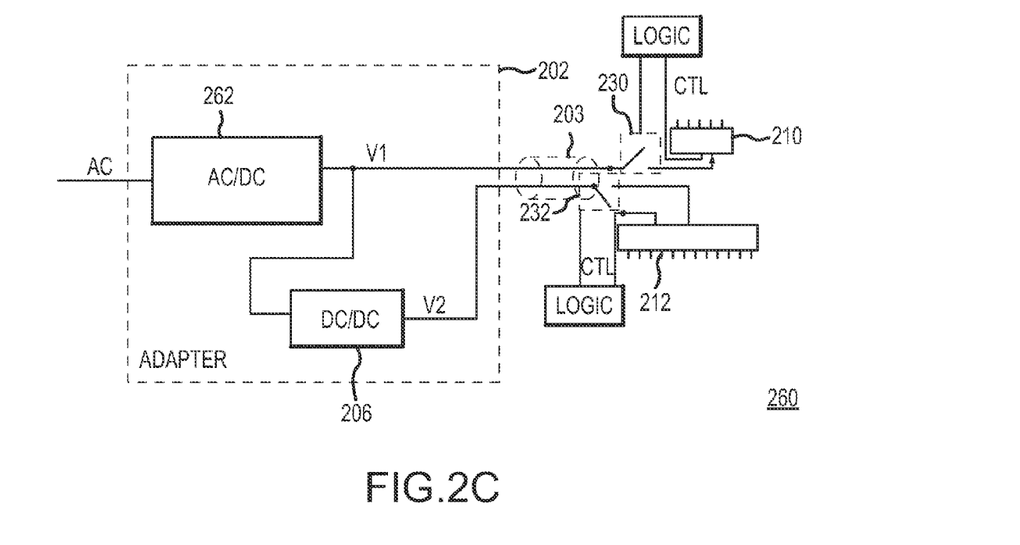
FIG. 2C is a block diagram of one embodiment of the adapter shown in FIG. 2A.

FIGS. 2A-2C illustrate another embodiment of a universal cable and/or adapter assembly 200. As shown in FIG. 2A, a power adapter 202 may be connected to a power source 104 via a plug 110. The power source 104 may be any source of electrical power, including, but not limited to, an AC or a DC power source. The adapter 202 may include an AC-to-DC power converter for converting the AC voltage received from the power source into a DC voltage. The power adapter 202 may be connected to a multi-output connector 204 that includes multiple output connectors 210, 212 that may be received by input ports (not shown) of different electronic devices 220, 222. For example, as shown in FIG. 2A, one connector 210 of the multi-output connector 204 may be configured for connection to an input port of a laptop computer 220, and the other connector 212 may be configured for connection to an input port of a handheld device 222, such as an iPod™ or an iPhone™. In one particular embodiment, one connector 210 may be a MAGSAFE connector manufactured by Apple Inc., and the other connector 212 may be a 30-pin connector. Generally, each output connector 210, 212 supplies a voltage having a voltage level that is different from that of the other output connectors 210, 212, although in some embodiments, the cable may have multiple output connectors that supply the same voltage.

As will be further described below, in one embodiment, shown in FIG. 2A, the adapter 202 may be connected to the multi-output connector 204 via a universal cable assembly 250. The universal cable assembly 250 may include a DC-to-DC voltage converter 206 encased in the connector housing to supply a first voltage level V1 through one output connector 210 and a second voltage level V2 through the other output connector 212. In an alternative embodiment, shown in FIG. 2C, the adapter 202 may include a universal adapter assembly 260, in which a DC-to-DC voltage converter 206 is provided within the housing of the power adapter 202.

FIG. 2B is a block diagram schematically illustrating some of the internal components of a universal cable assembly 250 that may be used in conjunction with the embodiment shown in FIG. 2A. Referring to FIG. 2B, the cable assembly 250 may be connected to the adapter 202 and may include a connector housing 204 having two output connectors 210 and 212. In one embodiment, the cable assembly 250 may be connected to the adapter 202 via a connector cable 203. In other embodiments, the connectors may be integrated into the adapter. The connector cable 203 may supply a first voltage V1 from the adapter 202 to a first connector 210 of the multi-output connector 204 and to a DC-to-DC converter 206 configured to convert the adapter voltage V1 to a second voltage V2. As previously discussed, the second voltage V2 may be greater or smaller than the first voltage V1, depending on whether a boost or buck converter is used. As shown in FIG. 2B, the DC-to-DC converter 206 may be connected to a second connector 212 of the multi-output connector 204 so that the voltage V2 output by the DC-to-DC converter may be supplied to the second connector. Accordingly, each connector 210 and 212 of the multi-output connector 204 may be configured to supply a different voltage V1 or V2 to a connected electronic device.

In one embodiment, the output connectors 210, 212 may each include a relay 230, 232 including a respective control line 228, 226 and logic 222, 224 for determining whether a connected electronic device 220, 222 is compatible with a particular output connector 210, 212. For example, as discussed above, the logic 222, 224 may be configured to determine whether the electronic device 220, 222 is an appropriate brand, whether the voltage level V1 or V2 supplied by each connector 210, 212 is appropriate for powering or charging a connected electronic device, and so on and so forth. Other embodiments may utilize other ways of controlling current flow between the output connectors 210, 212 and connected electronic devices.

FIG. 2C is a block diagram schematically illustrating some of the internal components of a universal adapter assembly 260 that may be used in conjunction with the embodiment shown in FIG. 2A. As shown, the adapter assembly 260 may be encased in the housing of the adapter 202, rather than in the connector housing 204. The adapter 202 may be connected to a multi-output connector 204 that includes two or more output connectors 210, 212. For example, the adapter 202 may be connected to the output connector 204 via a connector cable 203, or through some other connection mechanism. The adapter 202 may include an AC-to-DC converter 262 for converting the AC voltage received from the power source to a DC voltage. The AC-to-DC converter 262 may be connected to a first output connector 210 and to a DC-to-DC converter 206 to supply a first voltage V1 to the first connector and the DC-to-DC converter. The DC-to-DC converter 206 may convert the first voltage V1 to a second voltage V2 and supply the second voltage V2 to a second output connector 212. Accordingly, each connector 210 and 212 may be configured to supply a different voltage V1 or V2 to a connected electronic device 220, 222. In this embodiment, the connectors 210, 212 may be encased in a connector housing, or may be configured as separate standalone connectors 210, 212. Additionally, as discussed above with respect to the embodiment shown in FIG. 2B, the connectors 210, 212 may each utilize a relay 232, 230 including a respective control line 228, 226 and logic 222, 224 for determining whether or not an electronic device is compatible with a connected output connector 210, 212.

Although the illustrated embodiments only include two output connectors, it should be noted that other embodiments may include more or fewer outputs and/or voltages. Additionally, other connectors may include multiple output connectors that supply the same voltage level.

Figure 3A:
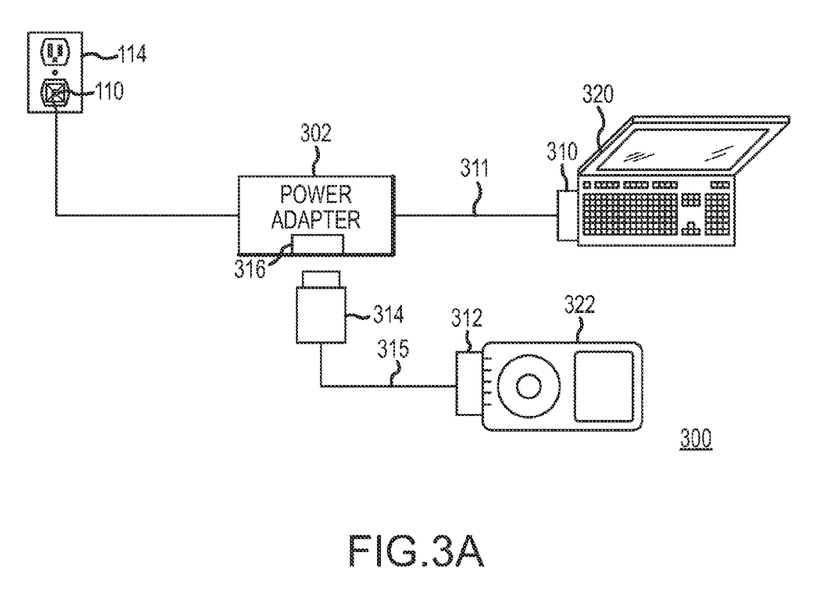
FIG. 3A illustrates an embodiment of a multi-output adapter connected to multiple electronic devices.
Figure 3B:
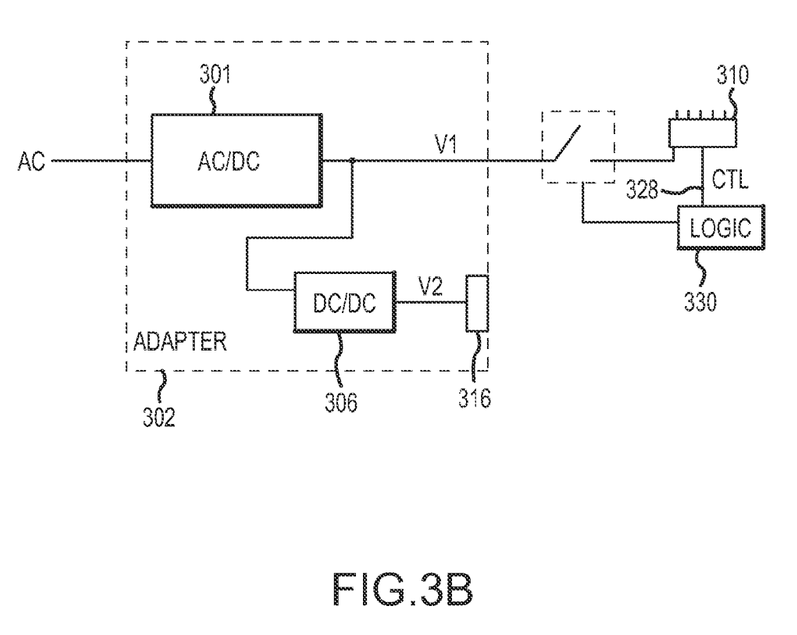
FIG. 3B is a block diagram of one embodiment of the multi-output adapter shown in FIG. 3A.

Another embodiment of a universal adapter assembly 300 is shown in FIGS. 3A and 3B. Referring to FIG. 3A, a power adapter 302 may be connected to a power source 104 via a plug 110. The adapter 302 may include an output connector 310 and an output port 316 configured to receive an input connector 314 of a connector cable 315. In one embodiment, the output connector 310 may be a MAGSAFE connector manufactured by Apple Inc., and the output port 316 may be a USB port. In other embodiments, other types of connector and/or port configurations may be used. The output connector 310 may be connected to the adapter 302 by a cord 311, and may be received by an input port (not shown) of a first electronic device 320. As is shown, the connector cable 315 may include an output connector 312 connected to the input connector 314, for example, via a cable. The output connector 312 may be received by an input port (not shown) of a second electronic device 322. The output connector 310 of the adapter 302 may be configured to supply a first voltage V1, and the output port 316 of the adapter may be configured to supply a second voltage V2. In one embodiment, the first electronic device 320 may be a laptop computer, and the second electronic device 322 may be a handheld device 322. Other embodiments may be configured to power and/or charge other electronic devices.

FIG. 3B is a block diagram schematically illustrating some of the internal components of the adapter 302 shown in FIG. 3A. Referring to FIG. 3B, the adapter 302 may include an AC-to-DC power converter 301 for converting the AC voltage received from the power source into a DC voltage. The AC-to-DC power converter 301 may be connected to an output connector 310 and a DC-to-DC converter 306 to supply a first voltage V1 to these components. As is shown, the DC-to-DC converter 306 may be provided in the housing of the power adapter 302. The DC-to-DC converter 306 may be configured to convert the first voltage V1 to a second voltage V2, and may supply the second voltage V2 to the output port 316. As discussed above, the output port 316 of the adapter 302 may be configured to receive a connector 314 of a connector cable 315. Similar to the embodiments shown in FIGS. 1A-1B, and 2A-2C, the output connector 310 of the adapter 302 may utilize a relay including a control line 328 and associated logic 330 for determining whether or not an electronic device is compatible with a connected electronic device 320 and supplying or withholding voltage accordingly.

Figure 4A:
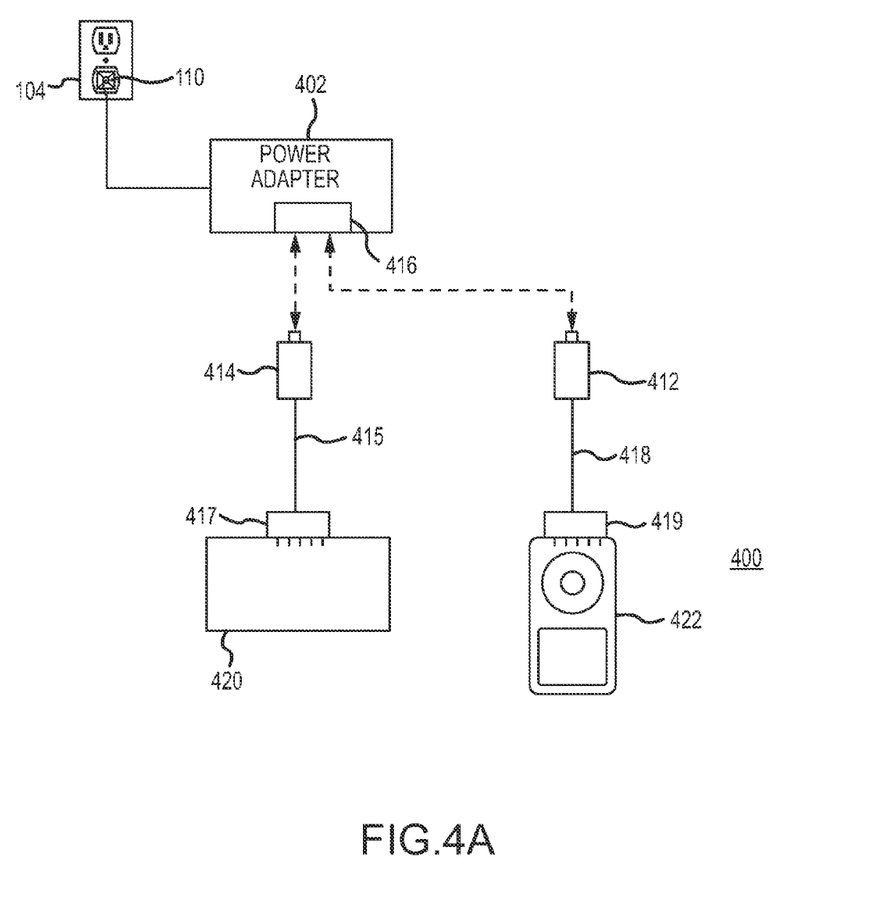
FIG. 4A illustrates an embodiment of a single-output adapter that may be connected to multiple connector cords, each connected to a respective electronic device.
Figure 4B:
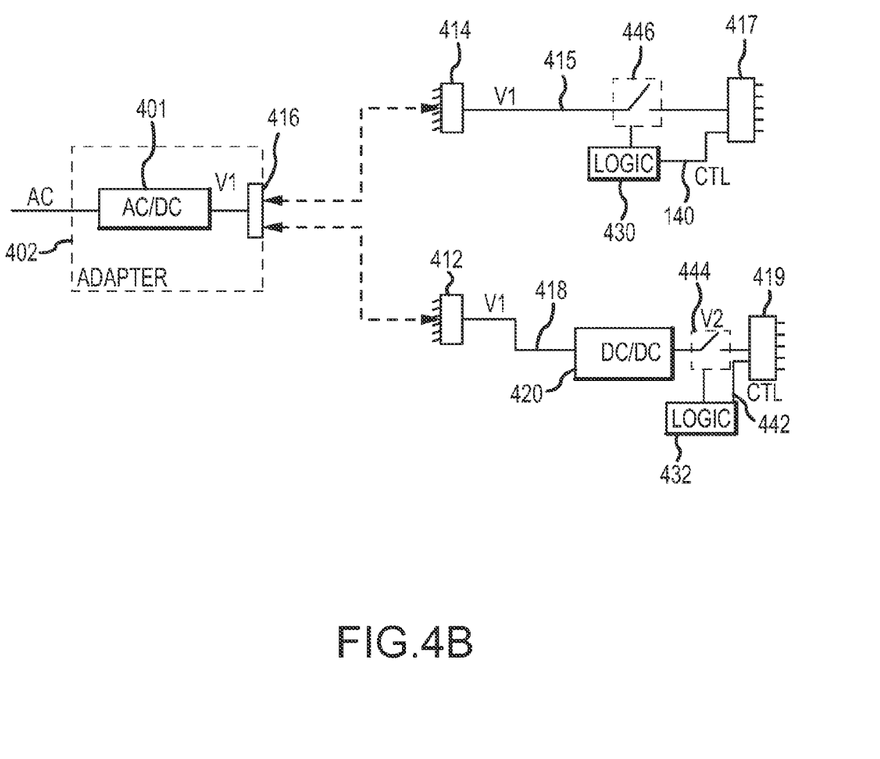
FIG. 4B is a block diagram of one embodiment of the single-output adapter and connector cords shown in FIG. 4A.
Figure 4C:
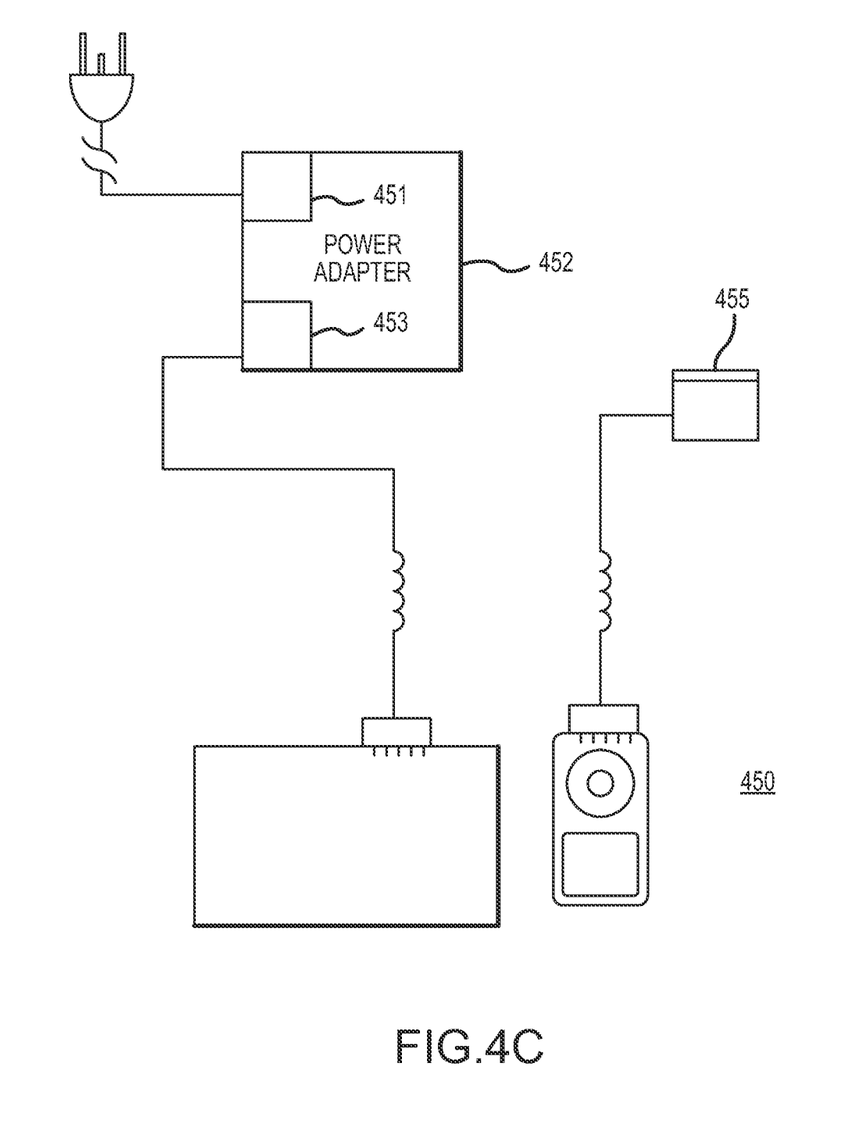
FIG. 4C is a block diagram of another embodiment of a single-output adapter that may be connected to multiple connector cords using a mechanical interlock plug.

FIGS. 4A-4C illustrate an embodiment of an adapter assembly 400 having a single output port for receiving multiple connectors 414, 412. Referring to FIG. 4A, the adapter assembly 400 may include an adapter 402 connected to a power source 104 via a plug 110. The adapter 402 may include an output port 416 configured to receive an input connector 414 of a first connector cable 415. The first connector cable 415 may also include an output connector 417 that may be received by an input port (not shown) of a first electronic device 420. In one particular embodiment, the output connector 417 may be a MAGSAFE connector.

The output port 416 may also be configured to receive an output connector 412 of a second connector cable 418. The cable 418 also include an output connector 419 that may be received by an input port (not shown) of a second electronic device 422. In one embodiment, the output connector 419 may be a 30-pin connector. When connected to the adapter 402, the connector cables 418, 415 may be configured to supply different output voltages V1 or V2 to a connected device 420, 422. For example, one cable 415 may be configured to supply a first voltage V1 to a laptop computer, and the other cable 418 may be configured to supply a different voltage V2 to a handheld device. Other embodiments may be configured to power and/or charge other electronic devices.

FIG. 4B is a block diagram schematically illustrating some of the internal components of the adapter assembly 400 shown in FIG. 4A. Referring to FIG. 4B, the adapter 402 may include an AC-to-DC power converter 401 for converting the AC voltage received from the power source into a DC voltage. The output voltage V1 of the AC-to-DC power converter 401 may be supplied to an output port 416 of the adapter 402. In one embodiment, the output voltage V1 of the adapter 402 be approximately 18.5V, although other voltage levels are also possible.

As shown, the first connector cable 415 may include an input connector 414 and an output connector 417 connected to the first connector via a cord. The input connector 414 of the cable 415 may be received by the output port 416 of the adapter 402, and the output connector 417 of the cable 415 may be received by an input port (not shown) of an electronic device. The output voltage level V1 of the first connector cable 415 may be equal to the output voltage level V1 of the adapter 402.

The second connector cable 418 may include an input connector 412 and an output connector 419 connected to the first connector via a cord. The connector cable 418 may further include a DC-to-DC converter 420 connected to the input and output connectors 412, 419. The DC-to-DC converter 420 may be provided within the casing of the cord connecting the connectors, or may be provided in a connector housing. The DC-to-DC converter 420 may be configured to receive the first voltage V1 from the input connector 412, convert the first voltage V1 to a second voltage V2, and transmit the second voltage V2 to the output connector 419. As discussed above, the input connector 412 of the second cable 418 may be received by the output port 416 of the adapter 402, and the output connector 419 may be received by an input port (not shown) of an electronic device. In one embodiment, the input connectors 412, 414 of the first and second connector cables 418, 415 may be identical, although in some embodiments, the input connectors of the cables may have different configurations.

In one embodiment, logic 430, 432 may be provided in each output connector 417, 419 for distinguishing between different connected devices. In one embodiment, the cables

415, 418 may utilize a relay including logic 430, 432 configured to determine whether a connected control line is active or inactive. As discussed above with respect to prior-described embodiments, if the control line is active, the relay 446, 444 may allow voltage to be supplied from the adapter 402, through the cable 415, 418, to a connected device. If the control line is inactive, the relay 446, 444 may prevent voltage from being supplied through the cable 415, 418.

Another embodiment of an adapter assembly 450 is shown in FIG. 4C. In this embodiment, the input connectors of the connector cables may be configured as one or more mechanical interlock plugs 451, 453, 455 that may be received by a receiving portion of an adapter 452. This embodiment may allow for the use of interchangeable plug and/or connector configurations with a single adapter, which may be useful to a user traveling in another country. As is shown, each mechanical interlock plug 451, 453, 455 may be removably attachable to a receiving portion of an adapter 453 using a mechanical joining feature. Some examples of locking features include, but are not limited to, a tongue and groove feature, a screw, a pin, a joint, and so on and so forth. The output connectors of the connector cables may be similar to those discussed above with respect to FIGS. 4A and 4B.

Figure 5:
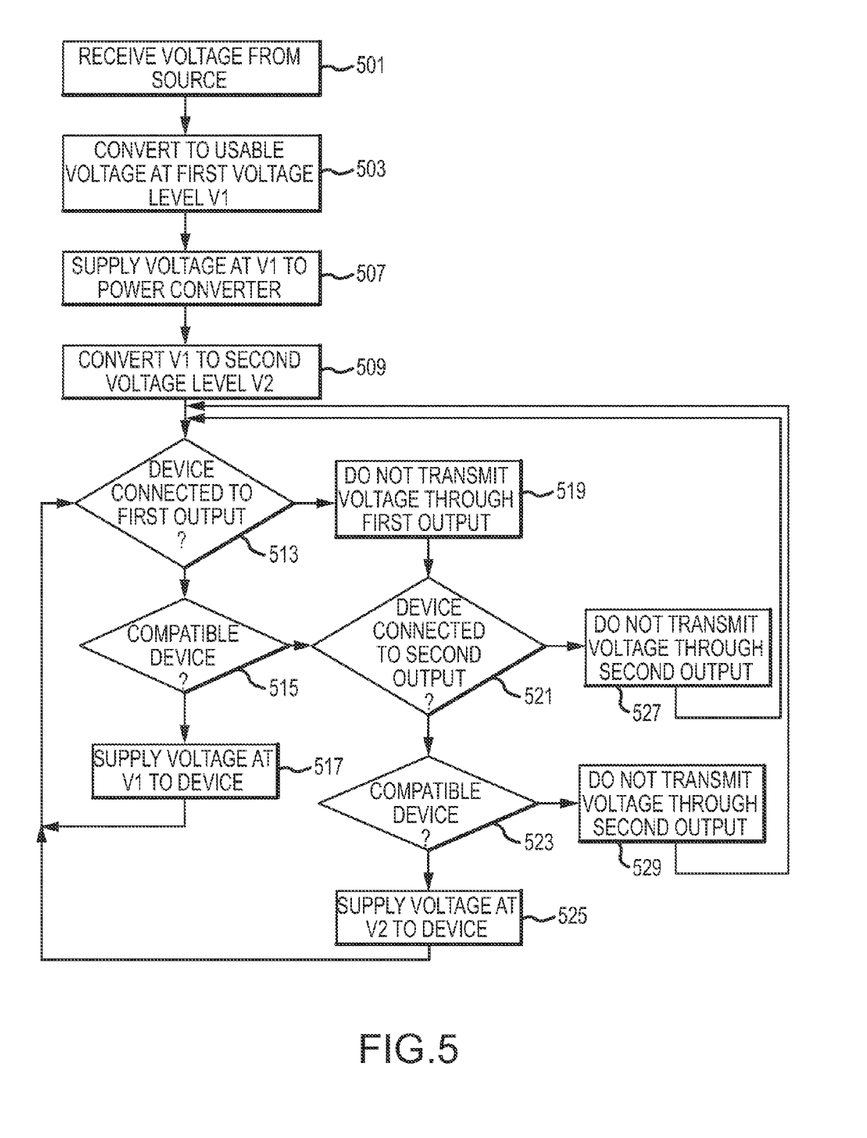
FIG. 5 is a flow diagram illustrating a method for supplying power between an electronic device and a multi-output adapter.

FIG. 5 is a flowchart illustrating a method for supplying power between an electronic device and a multi-output adapter. Initially, in operation 501 the embodiment may be configured to receive voltage from a power source. As discussed above, the voltage may be an AC voltage. In operation 503, the embodiment may be configured to convert the voltage from the power source to a voltage usable by a connected electronic device. This may be accomplished, for example, using an AC-to-DC converter, which may convert the AC voltage to a first DC voltage level. In operation 507, the embodiment may supply voltage at the first voltage level to a power converter. The power converter may be, for example, a DC-to-DC converter configured to convert the received voltage to a second voltage level different from the first voltage level. In operation 509, the converter may convert the voltage to the second voltage level.

In operation 513, the embodiment may determine whether an electronic device is connected to a first output. As discussed above, the operation may be performed by logic connected to a control line that is active when an electronic device is connected to the first output, and inactive when an electronic device is not connected to the first output. The output may be a connector, a port, or any other known output mechanism, and may be provided on the adapter itself, within a cable that can be connected to the adapter, within the housing of a connector, and so on and so forth.

If, in operation 513, the embodiment determines that an electronic device is connected to the first output, then in operation 515 the embodiment may determine whether the connected electronic device is compatible with the adapter. For example, the embodiment may determine whether the voltage required for charging or powering the electronic device is appropriate with respect to the first voltage level, an appropriate model or brand, and so on and so forth. In some embodiments, this may be performed by logic connected to a control line that is active or inactive based on whether a compatible electronic device is connected to the output. In some embodiments, operation 515 may be omitted. If, in operation 515, the embodiment determines that the connected electronic device is compatible with the adapter, then, in operation 517, the embodiment may proceed to supply voltage to the connected electronic device through the first output. For example, the logic may function as a relay including a switch that may be closed to allow voltage to flow through the switch to the first output. After the execution of operation 517, the method may then proceed back to operation 513. If, in operation 515, the embodiment determines that the connected electronic device is not compatible with the adapter, then in operation 521 the embodiment may determine whether an electronic device is connected to a second output. As discussed above, this operation may be performed by logic connected to a control line that is active when an electronic device is connected to the second output, and inactive when an electronic device is not connected to the second output. Similar to the first output, the second output may be a connector, a port, or any other known output mechanism and may be provided on the adapter itself, within a cable that can be connected to the adapter, within the housing of a connector, and so on and so forth.

Returning to operation 513, if the embodiment determines that an electronic device is not connected to the first output, then operation 519 is executed. In this operation, the embodiment may not transmit voltage through the first output. Next, operation 521 is executed. The embodiment may withhold voltage from the first output by opening a switch to prevent voltage from flowing to the first output.

If in operation 521, the embodiment determines that an electronic device is connected to the second output, then in operation 523 the embodiment may determine whether the connected electronic device is compatible with the second output. As discussed above with respect to the first output, this may include determining whether the second voltage level is appropriate for powering or charging the connected electronic device. If in operation 523 the embodiment determines that the connected electronic device is compatible with the second output, then operation 525 is executed and the embodiment may supply voltage at the second voltage level to the connected electronic device. If, in operation 523, the embodiment determines that the connected electronic device is not compatible with the second output, then operation 529 is executed. In this operation, the embodiment may withhold voltage to the second output. This may be accomplished via a relay, as discussed above. The method may then proceed to operation 513, in which the embodiment may determine whether an electronic device is connected to the first output.

Returning to operation 521, the embodiment may determine that an electronic device is not connected to the second output and thus, in operation 527, may withhold voltage to the second output. The method may then proceed to operation 513, in which the embodiment may determine whether an electronic device is connected to the first output.

It should be noted that the disclosed operations do not have to be performed in the order described above, but can be performed out of sequence in some embodiments. Additionally, some embodiments may not execute all of the recited operations.

Figure 6:
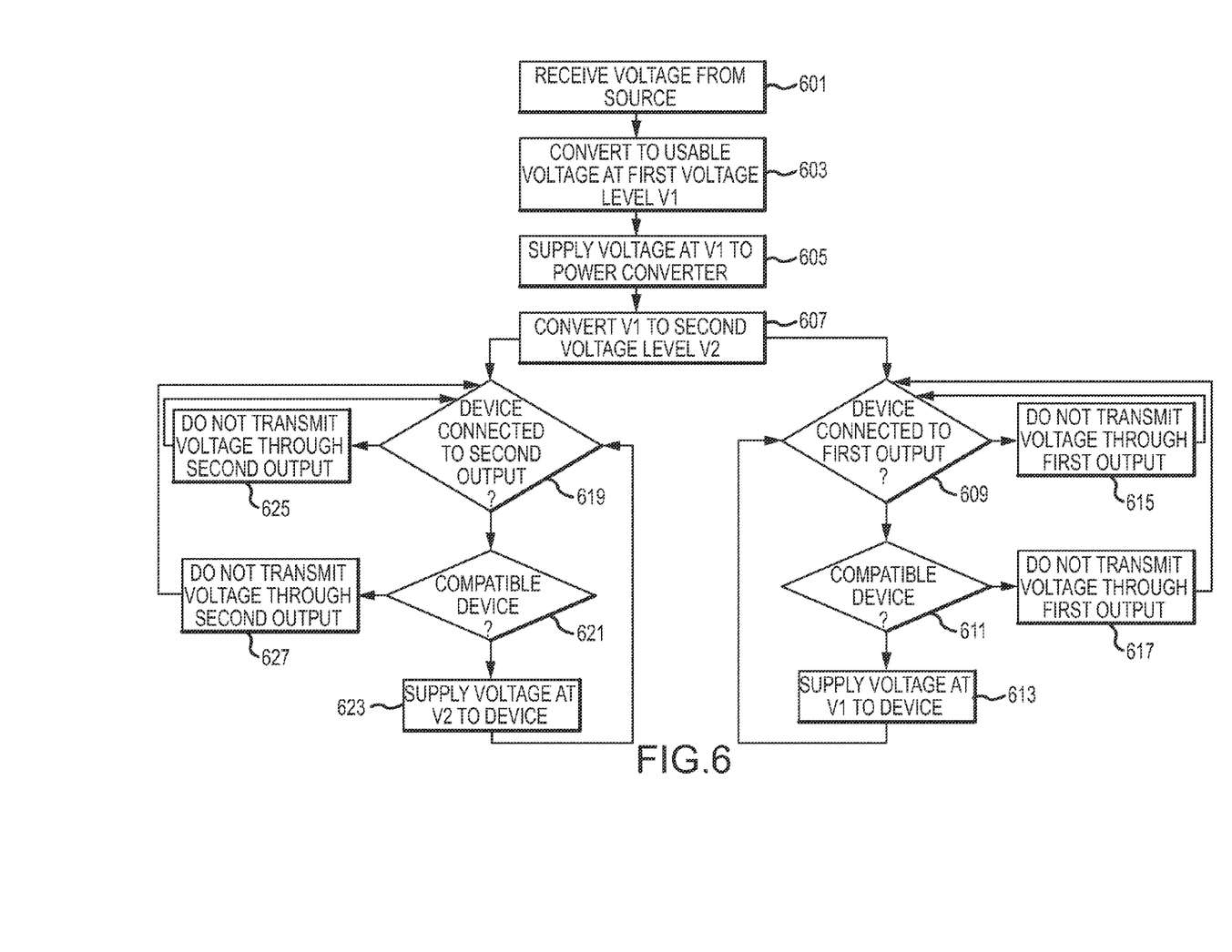
FIG. 6 is a flow diagram illustrating a method for concurrently supplying power to multiple electronic devices.

FIG. 6 is a flowchart illustrating a method for concurrently supplying power to a multiple connected electronic devices. Initially, in operation 601 the embodiment may be configured to receive voltage from a power source. As discussed above, the voltage may be an AC voltage. In operation 603, the embodiment may be configured to convert the voltage from the power source to a voltage usable by a connected electronic device. This may be accomplished, for example, using an AC-to-DC converter, which may convert the AC voltage to a first DC voltage level. In operation 605, the embodiment may supply voltage at the first voltage level to a power converter. The power converter may be, for example, a DC-to-DC converter. In operation 607, the converter may convert the voltage to a second voltage level.

As shown in FIG. 6, operations 609-617, relating to a first output, may be executed in parallel with operations 619-627, relating to a second output, so that the adapter assembly may concurrently power two or more electronic devices. The first and second outputs may be any type of output, including a connector, a port, and so on and so forth. The first and second outputs may be the same type of output, or may be different types of outputs. For example, the first output may be a port and the second output may be a connector. Similarly, the first and second outputs may be part of the adapter, or may be provided in a separate cable and/or connector. For example, in one embodiment, the first and second outputs may be two different connector outputs of a connector cable that may be attached to an adapter.

In operation 609, the embodiment may determine whether a device is connected to the first output. As discussed above, this may be accomplished using logic connected to a control line. When the control line is active, the logic may determine that a device is connected to the first output. When the control line is inactive, the logic may determine that a device is not connected to the first output. If, in operation 609, the embodiment determines that a device is connected to the first output, then in operation 611 the embodiment may determine whether the connected device is compatible. If, in operation 611, the embodiment determines that the connected device is compatible (for example, because it is compatible with the current type or level supplied by the first output) then, in operation 613, the embodiment may supply voltage at the first voltage level to the device connected at the first output.

However, if, in operation 611, the embodiment determines that the connected device is incompatible, then in operation 617 the embodiment may withhold voltage through the first output. The method may then proceed to operation 609, in which the embodiment may determine whether a device is connected to the first output.

Returning briefly to the discussion of operation 609, the embodiment determines that a device is not connected to the first output, the embodiment may withhold voltage through the first output in operation 615. The method may then proceed to operation 609 as described above.

As discussed above, operations 619-627 involve determinations made by the embodiment with respect to the second output. These operations may be executed in parallel with operations 609-617. In operation 619, the embodiment may determine whether a device is connected to the second output. As discussed above, this may be accomplished using logic connected to a control line. When the control line is active, the logic may determine that a device is connected to the second output. When the control line is inactive, the logic may determine that a device is not connected to the second output. If, in operation 619, the embodiment determines that a device is connected to the second output, then in operation 621, the embodiment may determine whether the connected device is compatible. If, in operation 621, the embodiment determines that the connected device is compatible, then, in operation 623, the embodiment may supply voltage at the second voltage level to the device connected at the first output. The method may then proceed to operation 619, in which the embodiment may determine whether a device is connected to the second output.

If, in operation 621, the embodiment determines that the connected device is incompatible, then in operation 627, the embodiment may withhold voltage through the second output. The method may then proceed to operation 619, in which the embodiment may determine whether a device is connected to the second output.

Returning to operation 619, if the embodiment determines that a device is not connected to the second output, the embodiment may withhold voltage through the first output in operation 625. The method may then proceed to operation 619, in which the embodiment may determine whether a device is connected to the second output.

Although the present invention has been described with respect to particular embodiments and methods of operation, it should be understood that changes to the described embodiments and/or methods may be made yet still embraced by alternative embodiments of the invention. For example, certain embodiments may omit or add operations to the methods and processes disclosed herein. Accordingly, the proper scope of the present invention is defined by the claims herein.

We claim:

1. An apparatus for providing power to an electronic device, comprising:
    a power input configured to receive an input voltage from a power supply;
    a rectifier operatively connected to the power input and configured to convert the input voltage to a first voltage;
    a first power output connector operatively connected to the rectifier, wherein the rectifier is further configured to transmit the first voltage to the first power output connector;
    a power converter operatively connected to the rectifier and configured to convert the first voltage to a second voltage different than the first voltage;
    a second power output connector operatively connected to the power converter, wherein the power converter is further configured to transmit the second voltage to the second power output connector; and
    a first relay operatively connected to the rectifier to selectively prevent the first voltage from being transmitted through the first power output connector,
        wherein a state of the first relay is determined at least in part by a state of a first control line,
        wherein the first control line does not transmit the first voltage,
        wherein the first relay includes a first logic configured to determine whether a first electronic device operatively connected to the first power output connector is compatible with the first voltage.

2. The apparatus of claim 1, further comprising:
    a second relay operatively connected to the power converter to selectively prevent the second voltage from being transmitted through the second power output connector,
        wherein a state of the second relay is determined at least in part by a state of a second control line,
        wherein the second control line does not transmit the second voltage,
        wherein the second relay includes a second logic configured to determine whether a second electronic device operatively connected to the second power output connector is compatible with the second voltage.

3. The apparatus of claim 2, wherein the first logic comprises a first logic circuit operatively connected to the first control line.

4. The apparatus of claim 3, wherein the first control line and the first power output connector are contained within a single output connector.

5. The apparatus of claim 4, wherein the single output connector terminates in a magnetic MAGSAFE connector.

6. The apparatus of claim 4, wherein the first logic is configured to determine whether an electronic device is compatible with the first voltage based at least partially on whether the control line is in an active or inactive state.

7. The apparatus of claim 1, further comprising a housing enclosing at least the first power output connector and the second power output connector.

8. The apparatus of claim 7, wherein the first power output connector is a connector and the second power output connector is a USB port.

9. The apparatus of claim 1, wherein the first voltage is 18.5 volts.

10. The apparatus of claim 9, wherein the second voltage is greater than the first voltage.

* * * * *